(12) United States Patent
Jang et al.

(10) Patent No.: US 8,597,814 B2
(45) Date of Patent: Dec. 3, 2013

(54) CONNECTION TERMINAL AND SECONDARY BATTERY USING THE SAME

(75) Inventors: Youngcheol Jang, Yongin-si (KR); Nohyun Kwag, Yongin-si (KR); Sangjoo Lee, Yongin-si (KR); Kyungwon Seo, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 821 days.

(21) Appl. No.: 12/076,215

(22) Filed: Mar. 14, 2008

(65) Prior Publication Data

US 2008/0226974 A1   Sep. 18, 2008

(30) Foreign Application Priority Data

Mar. 16, 2007   (KR) ........................ 10-2007-0026126

(51) Int. Cl.
*H01M 2/08* (2006.01)
*H01M 2/26* (2006.01)
*H01M 2/28* (2006.01)
*H01M 6/12* (2006.01)
*H01M 6/46* (2006.01)
*H01M 10/48* (2006.01)
*H01M 10/50* (2006.01)

(52) U.S. Cl.
USPC ............... 429/121; 429/62; 429/93; 429/162; 429/180

(58) Field of Classification Search
USPC .............................. 429/121, 62, 93, 162, 180
See application file for complete search history.

(56) References Cited

U.S. PATENT DOCUMENTS

| | | | |
|---|---|---|---|
| 2002/0181182 A1* | 12/2002 | Hasunuma et al. | 361/106 |
| 2004/0257036 A1 | 12/2004 | Kim | |
| 2005/0200447 A1 | 9/2005 | Chandler et al. | |
| 2005/0221174 A1* | 10/2005 | Yoon | 429/161 |
| 2006/0044728 A1 | 3/2006 | Kim et al. | |
| 2006/0127756 A1* | 6/2006 | Seo | 429/175 |
| 2008/0118820 A1* | 5/2008 | Jang et al. | 429/62 |

FOREIGN PATENT DOCUMENTS

| | | |
|---|---|---|
| CN | 1465109 | 12/2003 |
| JP | 2002-246010 | 8/2002 |

(Continued)

OTHER PUBLICATIONS

Machine translation of JP 2002246010 A, Kusanagi, Aug. 2002.*

(Continued)

*Primary Examiner* — Sean P Cullen
(74) *Attorney, Agent, or Firm* — Robert E. Bushnell, Esq.

(57) ABSTRACT

A connection terminal of a secondary battery and a secondary battery using the same, and more particularly, to a connection terminal and a secondary battery using the same that have the anti-press function and the support function of a protection circuit board as well as the function of electrically connecting a bare cell with the protection circuit board.
A connection terminal is installed between one side of a bare cell and a protective circuit board and includes a connection part that is connected with one electric terminal of the protective circuit board and a support part, and the support part has a horizontal support part that is fixed to one side of the bare cell and a vertical support part that connects the horizontal support part with the connection part.

18 Claims, 5 Drawing Sheets

(56) References Cited

FOREIGN PATENT DOCUMENTS

| | | | |
|---|---|---|---|
| JP | 2002246010 A | * | 8/2002 |
| JP | 2002-289160 | | 10/2002 |
| JP | 2003-223872 | | 8/2003 |
| KR | 2005-0054800 | | 6/2005 |
| KR | 10-2005-0077480 | | 8/2005 |
| KR | 2005-0097699 | | 10/2005 |
| KR | 659864 B1 | * | 12/2006 |

OTHER PUBLICATIONS

Machine translation of KR 659864 B1, Seong, Dec. 2006.*
Adhesive. Dictionary.com. Dictionary.com Unabridged. Random House, Inc. http://dictionary.reference.com/browse/adhesive (accessed: Sep. 30, 2010).*
Machine translation of KR 1020050077480, Moon et al., Aug. 2005.
USPTO Office Action issued on Oct. 6, 2009 [Paper No. 20090916] against U.S. Appl. No. 11/941,041.

* cited by examiner

CONNECTION TERMINAL AND SECONDARY BATTERY USING THE SAME

CLAIM OF PRIORITY

This application makes reference to, incorporates the same herein, and claims all benefits accruing under 35 U.S.C. §119 from an application earlier filed in the Korean Intellectual Property Office on Mar. 16, 2007 and there duly assigned Serial No. 10-2007-0026126.

BACKGROUND OF THE INVENTION

1. Field of the Invention

The present invention relates to a connection terminal and a secondary battery using the same, and more particularly, to a connection terminal and a secondary battery using the same that have the anti-press function and the support function of a protection circuit board as well as the function of electrically connecting a bare cell with the protection circuit board.

2. Description of the Prior Art

Generally, a secondary battery refers to a chargeable and dischargeable battery that is different from anon-chargeable primary battery, and the secondary battery is widely used in the field of small high-tech electronic equipments such as cellular phones, PDAs, notebook computers and the like. In particular, a lithium secondary battery has been increasingly used because lithium secondary battery has an operating voltage of 3.6V that is three times higher than that of either a nickel-cadmium battery or a nickel-hydrogen battery widely used as power supplies for electronic equipment and the energy density per unit weight of the lithium secondary battery is higher.

The lithium secondary battery uses a lithium-based oxide as a positive electrode active material and a carbon material as a negative electrode active material. Furthermore, the lithium secondary battery is formed in various shapes, and the typical shape of the lithium battery may be cylindrical shape, square shape and pouch shape.

According to the construction of the lithium secondary battery having a rectangular shape, the rectangular secondary battery includes an electrode assembly having a jelly roll type that is formed by stacking and winding a positive electrode plate and a negative electrode plate in a state of interposing a separator between them, a can which has one side open to receive the electrode assembly, and a cap assembly that seals the open side of the can. Here, a unit including the electrode assembly, the can and the cap assembly is typically referred to as a bare cell of the lithium secondary battery, and the bare cell corresponds to one independent secondary battery.

And, a unit that has a protective circuit module coupled to the bare cell is typically referred to as a core pack of the lithium secondary battery, and a secondary battery used for a small electronic equipment such as a cellular phone, a PDA, a digital camera and the like is typically manufactured by inserting either the bare cell or the core pack into an exterior case referred to as a hard case. Here, the exterior case of the secondary battery forms a portion of the outside surface of the small electronic equipment.

Moreover, a secondary battery that is designed in a relatively simple external shape and can be used for various different small electronic equipments is being manufactured in recent years, and the secondary battery is typically referred to as an inner pack. Hereinafter, the term of inner pack will be used.

The general configuration of the inner pack is formed by arranging a protective circuit board such that the protective circuit board faces with any one side of relatively long two sides among four sides of a bare cell and molding between the bare cell and the protective circuit board by a molding resin after connecting the bare cell with the protective circuit board by a connecting apparatus.

Furthermore, a support made of Poron tape is installed between the bare cell and the protective circuit board. The Poron tape" refers a buffering element arranged between the bare cell and the protective circuit board, and the Poron tape is made of electrically insulated material and offers functions of filling a gap between the bare cell and the protective circuit board and buffering an impact between the bare cell and the protective circuit board induced by an external force applied to the battery. The support serves for filling up a gap between the bare cell and the protective circuit board. Hence, when an external force exerts on the protective circuit board in the direction of the bare cell, it is possible to minimize the deformation of the protective circuit board which is caused by the fact that the protective circuit board is supported and pressed by the support.

According to such a conventional inner pack, however, because a gap between the bare cell and the protective circuit board is filled up with a separate support made of Poron tape, a relatively expensive Poron tape needs to be employed as one of the material of the secondary battery, and thus such a problem is arisen that the total manufacturing cost of the secondary battery may be increased.

Furthermore, because a support made of Poron tape should be fixed on one side of the protective circuit board and one side surface of the bare cell, such a problem is arisen that the manufacturing process of the secondary battery becomes complicated.

SUMMARY OF THE INVENTION

It is, therefore, one object of the present invention to provide an improved secondary battery and to solve the aforementioned problems of the contemporary batteries as stated above.

It is another object of the present invention to provide a connection terminal of a secondary battery that has the function of preventing a protective circuit board from being pressed between the side surface of a bare cell and the protective circuit board and the function of supporting the protective circuit board as well as the basic function of electrically connecting the bare cell with the protective circuit board.

It is still another object of the present invention is to provide a secondary battery that enables a connection terminal installed between the bare cell and the protective circuit board to have a function of preventing the protective circuit board from being pressed in the direction of the bare cell and a function of ensuring the coupling between the protective circuit board and the bare cell as well as another function of electrical coupling, and enables a separate support not to be installed between the bare cell and the protective circuit board, and thus enables the simplification of the manufacturing process and the reduction of the manufacturing cost.

In order to accomplish the aforementioned aspects, a connection terminal of a secondary battery constructed according to the present invention is installed between one side of a bare cell and a protective circuit board and includes a connection part that is connected with one electric terminal of the protective circuit board and a support part, and the support part has a horizontal support part that is fixed to one side of the bare cell and a vertical support part that connects the horizontal support part with the connection part.

At least the side of the connection part that is connected with one electric terminal of the protective circuit board may be formed by a conductive plate, and at least a portion of the support part may have an insulating part to insulate the conductive plate of the connection part from one side of the bare cell.

The conductive plate of the connection part may have a step that is formed to be stepped from one electric terminal of the protective circuit board.

The vertical support part may have a curved shape, and a through-hole through which a molding resin passes may be formed on the vertical support part. Here, the through-hole may be formed on the inside of the vertical support part except the circumference thereof, or the through-hole may be formed by being inwardly cut away from the circumference of the vertical support part.

In the lengthwise direction of one side of the bare cell, the horizontal support part and the vertical support part may have the half length of the connection part and may be positioned on the center of the connection part.

The horizontal support part may be fixed to one side of the bare cell by an insulating double-sided tape.

According to another aspect of the present invention, a secondary battery includes a bare cell that is chargeable and dischargeable, a protection circuit board arranged to face one side of the bare cell, a connection terminal that is installed between one side of the bare cell and a protective circuit board and includes a connection part connected with one electric terminal of the protective circuit board and a support part which has a horizontal support part fixed to one side of the bare cell and a vertical support part connecting the horizontal support part with the connection part, a first lead tab connecting any one pole having one polarity of the bare cell with the connection terminal, and a second lead tab connecting the other polarity of the protective circuit board with the bare cell.

The bare cell may have such an external shape that two relatively larger sides are coupled to four relatively smaller continuous sides to face each other, and the four smaller sides may be composed of a pair of parallel long side parts and a pair of parallel short side parts with reference to edges on which the four smaller sides are joined to the large two sides, and an electrode terminal may be installed on any one short side part of two short side parts in an insulated state, and the horizontal support part of the connection terminal may be fixed to any one long side part of the bare cell.

The electrode terminal of the bare cell and the connection terminal may be connected by the first lead tab.

The horizontal support part of the connection terminal may be fixed to the long side part of the bare cell by an insulating double-sided tape.

At least the side of the connection part that is connected with one electric terminal of the protective circuit board may be formed by a conductive plate, and the conductive plate may have a step that is formed to be stepped from one electric terminal of the protective circuit board, and one end of the first lead tab can be coupled to the step.

The connection terminal and the first lead tab may be connected by a secondary protective element. Here, the secondary protective element can be a PTC (Positive Temperature Coefficient) element.

The first and second lead tabs may be formed by nickel or nickel alloy.

The protective circuit board, the connection terminal and the first lead tab may be coupled to the bare cell by an insulating double-sided tape that is attached to the bare cell.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
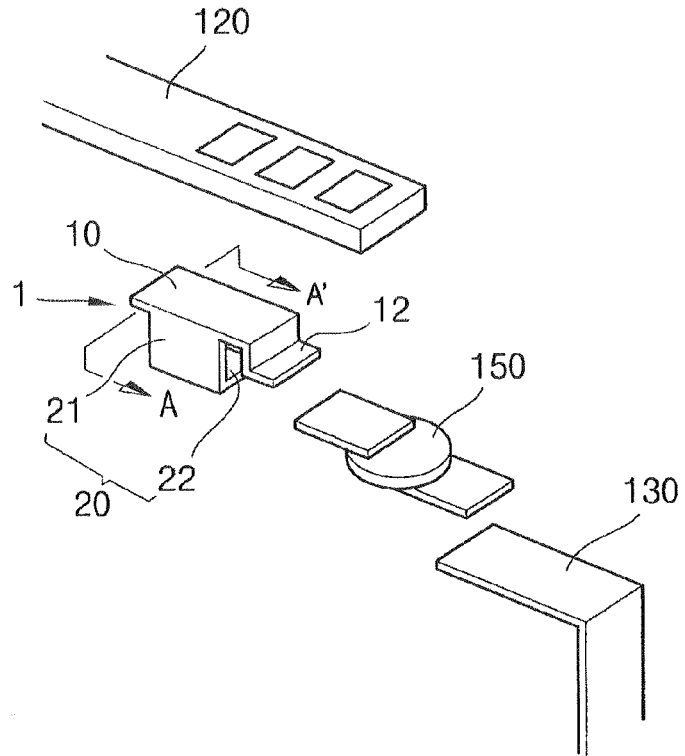
FIG. 1 is an oblique view illustrating a connection terminal and the connection structure of the connection terminal constructed according to an embodiment of the present invention.

Hereinafter, preferred embodiments of the present invention will be described with reference to the accompanying drawings. Like reference numbers refer to like components in the drawings.

Figure 2:
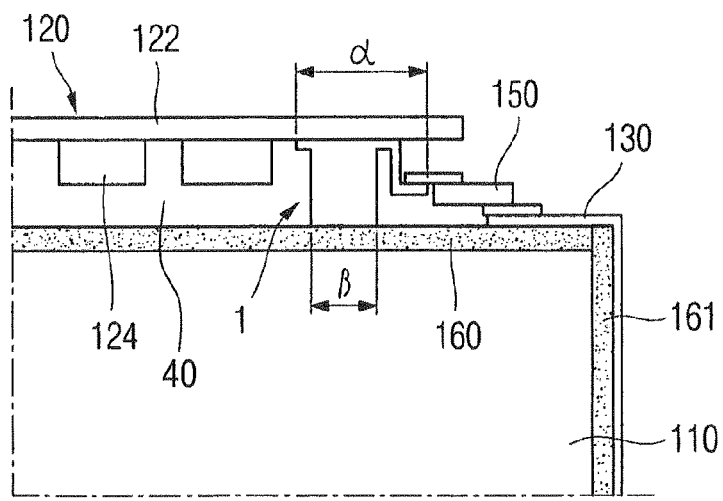
FIG. 2 is a side cross-sectional view illustrating a coupling state of the connection terminal of FIG. 1.
Figure 3:
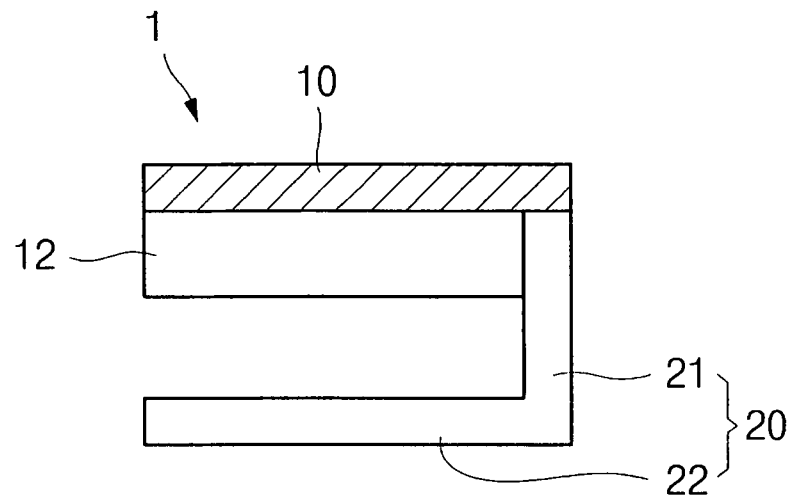
FIG. 3 is a cross-sectional view taken along line A-A' of FIG. 1 and illustrating the connection terminal constructed according to the embodiment of FIG. 1 of the present invention.

Turning now to FIGS. 1, 2 and 3, FIG. 1 is a perspective view illustrating a connection terminal and the connection structure of the connection terminal constructed according to an embodiment of the present invention; FIG. 2 is a side view illustrating a coupling state of the connection terminal of FIG. 1; and FIG. 3 is a cross-sectional view taken along line A-A' of FIG. 1 and illustrating the connection terminal constructed according to the embodiment of FIG. 1 of the present invention.

As illustrated in the drawings, a connection terminal 1 constructed according to the present invention is installed between one side of a bare cell 110 and a protective circuit board 120, and protective circuit board 120 forms a protective circuit for bare cell 110. Connection terminal 1 electrically connects the same polarity of bare cell 110 and protective circuit board 120. Hereinafter, one side of protective circuit board 120 to which connection terminal 1 is fixed is referred to as a "first side of the protective circuit board", and one side of bare cell 110 which faces the first side of protective circuit board 120 is referred to as a "first side of the bare cell."

Connection terminal 1 includes a connection part 10 and a support part (i.e. a support) 20.

Connection part 10 is fixed to the first side of protective circuit board 120 to be electrically connected with protective circuit board 120. That is, a lead apparatus (not shown) electrically connected with any one polarity of bare cell 110 is connected with connection part 10. Connection part 10 includes a conductive plate that is electrically connected with one electric terminal of the protective circuit board. Here, the entire connection part 10 may be formed by the conductive plate as like in the present embodiment. Alternatively, only the side portion of connection part 10 that is connected with the electric terminal of the protective circuit board may be formed by the conductive plate, and only a portion of the connection part is formed by the conductive plate. Furthermore, connection part 10 may be fixed to the first side of protective circuit board 120 by welding, and a step 12 may be formed at one end of connection part 10 to be stepped from the electric terminal of protective circuit board 120, and the lead apparatus for electrical connection with bare cell 110 may be electrically coupled to step 12. Here, the lead apparatus includes various connection apparatuses for connecting the same polarity of protective circuit board 120 and bare cell 110 and can be, for example, a PTC (Positive Temperature Coefficient) element or a connection apparatus manufactured by forming a conductor in a tab or plate shape. According to the present embodiment, a step is formed on one end of the conductive plate that forms the connection part.

Support part 20 includes a horizontal support part (i.e. horizontal part) 22 and a vertical support part (i.e. vertical part) 21, and horizontal support part 22 is fixed to the first side of bare cell 110, and vertical support part 21 connects horizontal support part 22 with connection part 10. Here, horizontal support part 22 may be fixed by an electrically insulating double-sided tape 160 that is attached to the first side of bare cell 110. Support part 20 prevents protective circuit board 120 from being pressed towards the first side of bare cell 110. And, support part 20 together with connection part 10 serves for more firmly coupling protective circuit board 120 with bare cell 110.

At least the side of connection part 10 that is electrically connected with one electric terminal of protective circuit board 120 may be formed by a conductive plate, and at least a portion of support part 20 may have an insulating part to insulate the conductive plate of connection part 10 from one side of bare cell 110.

And, the maximum length of support part 20 is the half of the total length of connection part 10 in the lengthwise direction of the first side of bare cell 110, and thus it is preferred that support part 20 is positioned on the center of connection part 10. Referring to FIG. 2, the total length of connection part 10 in the lengthwise direction of the first side of bare cell 110 is denoted by "α," and the maximum length of horizontal support part 22 and vertical support part 21 is denoted by "β," and connection terminal 1 is formed such that α to β approximately equals 2 to 1.

According to the configuration of connection terminal 1, when an external force is applied to protective circuit board 120 towards the first side of bare cell 110, the external force is transferred to connection part 10 and support part 20 of connection terminal 1, and support part 20 more stably supports connection part 10 receiving the external force because support part 20 is positioned at the center of connection part 10. Furthermore, because support part 20 positioned at the center of connection part 10 sufficiently stably supports connection part 10 when support part 20 has the half length of the total length of connection part 10, extra amount of material used for manufacturing connection terminal 1 is consumed than is necessary when manufacturing support part 20 to have the length of more than half of that of connection part 10.

Furthermore, according to FIG. 3, support part 20 has a cross-sectional shape of a right angle "L" taken from the first side of protective circuit board 120 in the direction of the first side of bare cell 110, and connection terminal 1 composed of support part 20 and connection part 10 has a cross-sectional shape of C shape (i.e. a channel shape) "⊏" taken from the first side of protective circuit board 120 in the direction of the first side of bare cell 110.

Moreover, connection part 10 and support part 20 of connection terminal 1 may be formed by nickel or nickel alloy, but not limited thereto. Connection part 10 and support part 20 may be formed of various metal materials in addition to nickel or nickel alloy.

Figure 4:
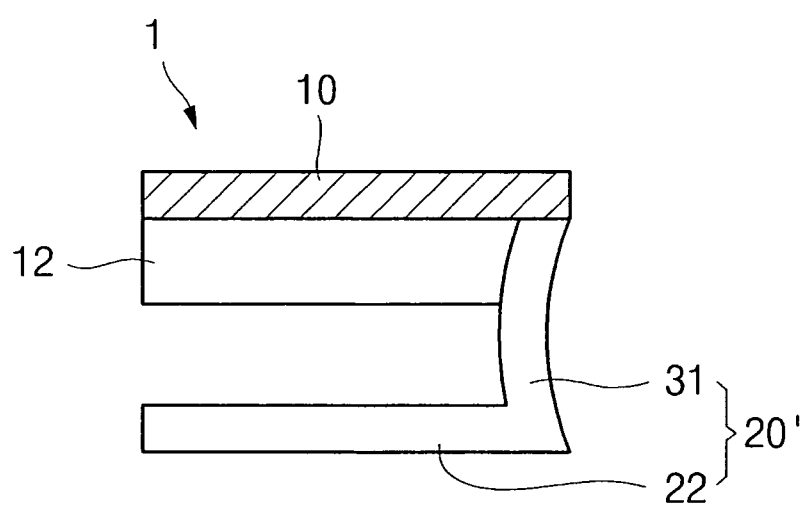
FIG. 4 is a cross-sectional view illustrating a connection terminal constructed according to another embodiment of the present invention.

In addition, FIG. 4 illustrates another embodiment of connection terminal 1. As illustrated in FIG. 4, a support part 20' of connection terminal 1 has a curved vertical support part 31. By forming vertical support part 31 to have a curved shape, vertical support part 31 may support connection part 10 while exerting an appropriate elastic force when an external force is applied in the direction of towards to the first side of bare cell 110. As a result, support part 20' may support connection part 10 in such a state that a deformation or damage risk due to an external force is reduced as compared with the case that support part 20 receives an external force without a shock-absorbing operation realized by support part 20'.

Figure 5:
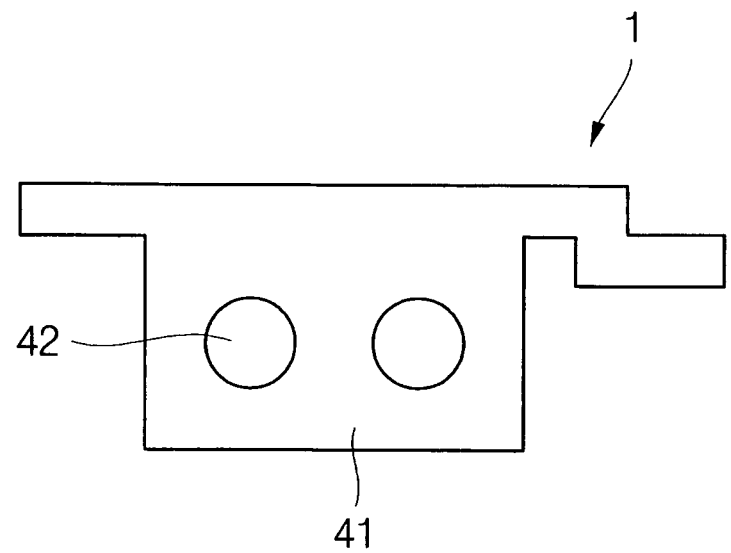
FIG. 5 is side view illustrating a connection terminal according to yet another embodiment of the present invention.
Figure 6:
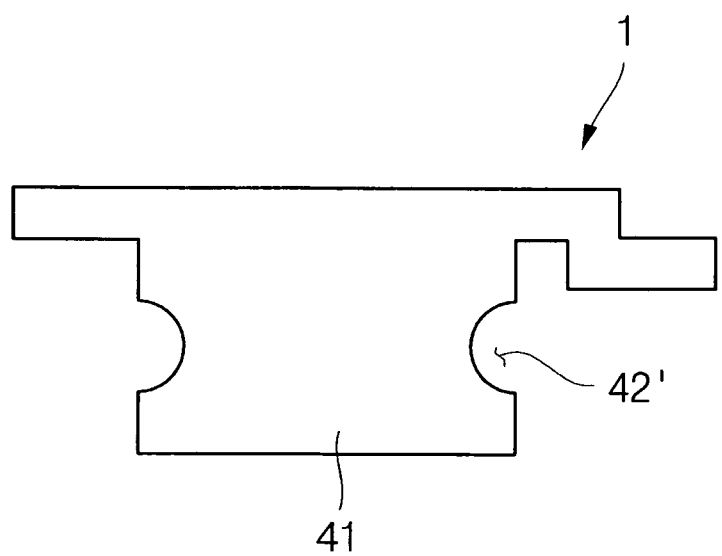
FIG. 6 is side view illustrating a connection terminal according to still another embodiment of the present invention.

FIG. 5 is side view illustrating a connection terminal according to yet another embodiment of the present invention; and FIG. 6 is side view illustrating a connection terminal according to still another embodiment of the present invention. The detailed description thereabout will be made in an embodiment of the secondary battery to be described later.

Figure 7:
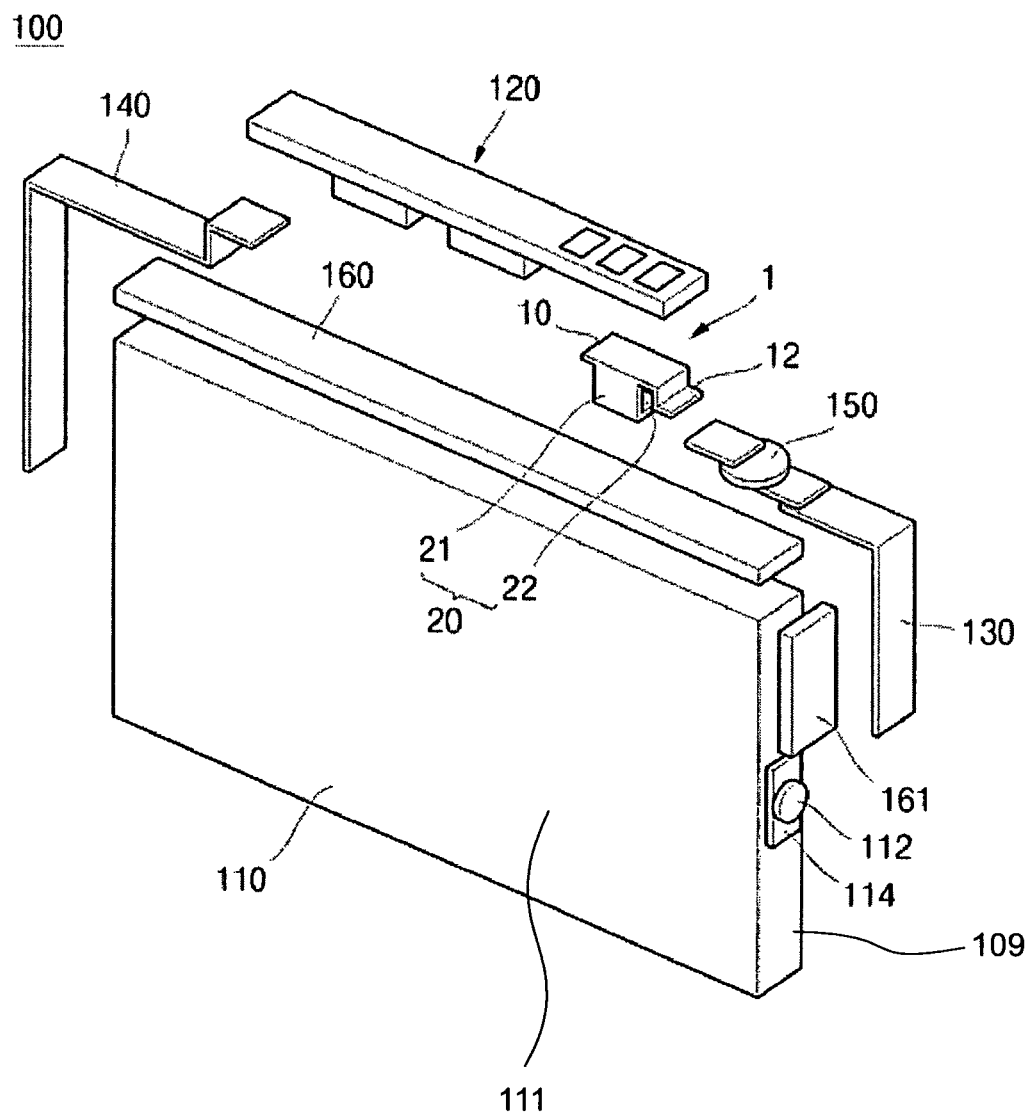
FIG. 7 is an exploded perspective view illustrating a secondary battery to which the connection terminal constructed according to the embodiment of FIG. 1 is applied.
Figure 8:
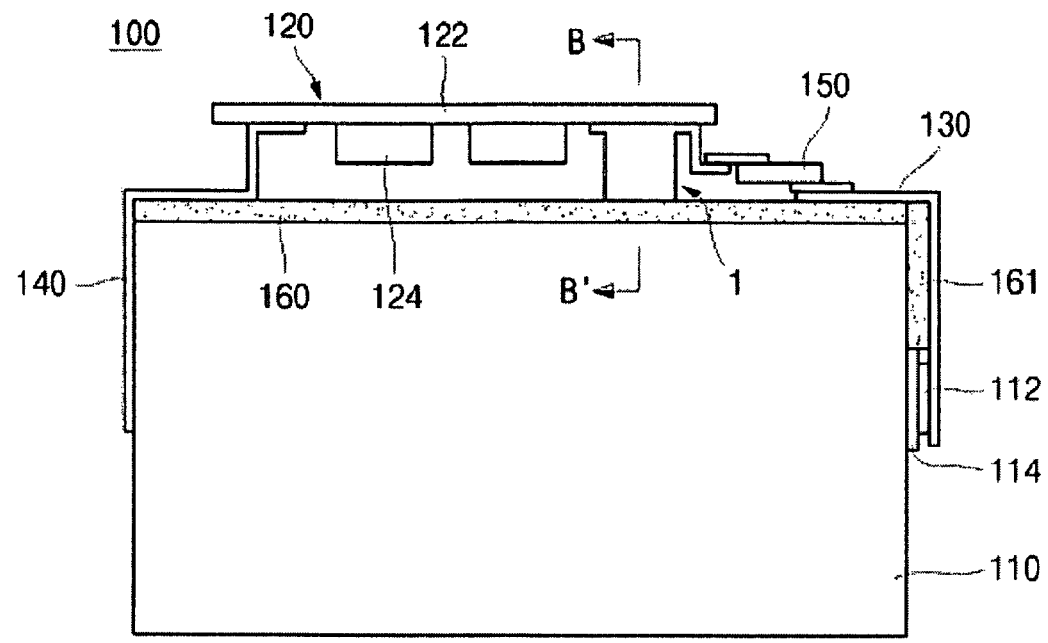
FIG. 8 is a side view illustrating the coupling state of the secondary battery of FIG. 7.
Figure 9:
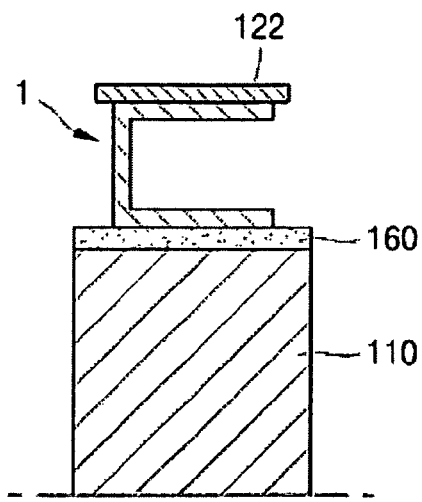
FIG. 9 is a cross-sectional view taken along the line B-B' and illustrating a connection terminal of FIG. 8.

FIGS. 7 to 9 illustrate an embodiment of a secondary battery to which the connection terminal constructed according to the embodiment of FIGS. 1 to 3 is applied. FIG. 7 is an exploded perspective view illustrating a secondary battery to which the connection terminal constructed according to the embodiment of FIG. 1 is applied, FIG. 8 is a side view illustrating the coupling state of the secondary battery of FIG. 7, and FIG. 9 is a cross-sectional view taken along line B-B' and illustrating a connection terminal of FIG. 8.

As illustrated in the FIG. 7, a secondary battery 100 constructed according to an embodiment of the present invention includes bare cell 110, protective circuit board 120, connection terminal 1, a first lead tab (i.e. a first tab) 130, and a second lead tab (i.e. a second tab) 140.

Bare cell 110 is chargeable and dischargeable and is a bare cell 110 used for a typical secondary battery. Hence, the description about the bare cell will be briefly made in the present embodiment.

Bare cell 110 includes a can 111 having one side open (not shown), an electrode assembly (not shown) that is chargeable and dischargeable and is inserted into the can, and a cap plate 109 sealing the open side of the can. Referring to FIG. 7, bare cell 110 is formed in a way that two relatively larger sides are coupled to relatively small four sides to face with each other. According to the present embodiment, bare cell 110 has a rectangular or a nearly rectangular shape, but not limited thereto.

Here, two larger sides of bare cell 110 are referred to as a front side and a rear side respectively, if necessary. Furthermore, two sides of the four small sides of bare cell 110 that run parallel to each other in one direction are longer in length than two sides that run parallel to each other in another direction which is perpendicular to the one direction. In other words, the four sides of bare cell 110 are composed of two sides having a relatively longer edge length and two sides having a relatively shorter edge length. Hereinafter, two sides having a relatively longer edge length are referred to as long side parts, and two sides having a relatively shorter edge length are referred to as short side parts.

An electrode terminal 112 is installed on any one short side part of two short side parts of bare cell 110 in an insulated state, and the electrode terminal is typically installed on the cap plate that forms any one short side part of two short side parts. Here, the expression that electrode terminal 112 is installed on the short side part in an insulated state means that electrode terminal 112 is insulated from cap plate 109 that is one short side of bare cell 110, and an insulating gasket 114 is typically used for insulating electrode terminal 112 from cap plate 109.

The electrode assembly of bare cell 110 is formed in a jelly roll type by winding a positive electrode palate and a negative electrode plate in a state of interposing a separator between them in one direction. Here, the positive electrode plate includes a positive electrode current collector formed of a sheet metal, for example, an aluminum (Al) foil having an excellent conductivity and a positive electrode active material layer coated on both sides of the positive electrode current collector. Moreover, an area on which the positive electrode active material layer is not formed, that is, a positive electrode non-coating portion is formed at both ends of the positive electrode plate. In addition, the negative electrode plate includes a negative electrode current collector formed of a conductive sheet metal, for example, a copper (Cu) or nickel (Ni) foil and a negative electrode active material layer coated on both sides of the negative electrode current collector. An area on which the negative electrode active material layer is not formed, that is, a negative electrode non-coating portion is formed on both ends of the negative electrode plate.

An electrode tab is attached to the positive electrode non-coating portion of the positive electrode plate and the negative electrode non-coating portion of the negative electrode plate. The electrode tab attached to the positive electrode non-coating portion is electrically connected with the cap plate of the bare cell, so that the entire can 111 of bare cell 110 forms one positive electrode terminal, and the electrode tab attached to the negative electrode non-coating portion is electrically connected with the electrode terminal of the cap plate, so that the electrode terminal forms a negative electrode terminal.

Protective circuit board 120 is installed to face with any one long side part of two long side parts of bare cell 110. Protective circuit board 120 forms a protective circuit for bare cell 110 and is formed in a way that a plurality of electronic elements 124 are mounted on a printed circuit board (PCB) 122.

And, connection terminal 1 is installed for connecting the same one polarity of bare cell 110 and protective circuit board 120, and connection terminal 1 has the configuration and operation described in the embodiment of FIGS. 1 to 3.

As described in the embodiment of FIGS. 1 to 3, connection terminal 1 includes connection part 10 and support part 20, and connection part 10 is fixed to one side of protective circuit board 120, and support part 20 is extended from connection part 10 and is fixed to one side of bare cell 110. According to the present embodiment, protective circuit board 120 is installed to face any one long side part of bare cell 110, and support part 20 of connection terminal 1 is surface-contacted with the long side part of bare cell 110. Furthermore, connection terminal 1 electrically connects the same one polarity of bare cell 110 and protective circuit board 120 and serves for preventing protective circuit board 120 from being pressed in the direction towards bare cell 110 or from being moved away from the original position by other external forces. Because the description thereabout has been made with reference to the embodiment of FIGS. 1 to 3, the detailed description thereabout will be omitted in the present embodiment.

The constitution of a through-hole that is formed on support part 20 of connection terminal 10 for passage of a molding resin 40 will be described with reference to FIGS. 5 and 6. That is, as illustrated in FIG. 5, one or more through-holes 42 are formed on a vertical support part 41 of support part 20, and the pressure produced by supplying the molding resin by through-holes 42 of vertical support part 41 may be weakly applied to connection terminal 1 when molding a space between bare cell 110 and protective circuit board 120 by the molding resin. In other words, the substantial amount of the molding resin supplied to a space between bare cell 110 and protective circuit board 120 passes through through-hole 42 of vertical support part 41, and thus vertical support part 41 receives lower supply pressure as compared with the case that the entire vertical support part receives the supply pressure of the molding resin in a sealed state (i.e. vertical support part 21 without through hole(s)). As a result, the extent of movement of connection terminal 1 by the supply of the molding resin is reduced, and thus the possibility that protective circuit board 120 deforms from the original state is lowered.

FIG. 6 illustrates another embodiment of a through-hole formed on a vertical support part. One or more through-hole 42 of FIG. 5 is formed not on the circumference of vertical support part 41 but on the inside area of vertical support part 41, whereas a through-hole (or a partial through hole) 42' of FIG. 6 is formed by being cut away from the circumference of vertical support part 41.

Both ends of a first lead tab 130 are coupled to electrode terminal 112 of bare cell 110 and connection part 10 of connection terminal 1 respectively, and first lead tab 130 is electrically coupled to electrode terminal 112 and connection part 10 of connection terminal 1 respectively by welding. Furthermore, first lead tab 130 may be directly coupled to connection part 10 of connection terminal 1, and first lead tab 130 may also be coupled to connection terminal 1 by a secondary protective element that is positioned between first lead tab 130 and connection part 10 of connection terminal 1 as like the present embodiment.

Here, the secondary protective element is an element that serves for cutting off an internal circuit of a battery when over-charging and over-discharging or short of the bare cell is occurred. In the present embodiment, a PTC (Positive Temperature Coefficient) element 150 is employed as the secondary protective element. PTC element 150 functions as a conductor at normal temperature. When the ambient temperature is increased, the electric resistance of PTC element 150 is increased in proportion to the increased temperature, so that PTC 150 element becomes to function as a nonconductor.

Second lead tab 140 electrically connects the opposite polarity to electrode terminal 112 of bare cell 110 to protective circuit board 120, and both ends of second lead tab 140 are respectively electrically connected to one side of bare cell 110 that has an opposite polarity to electrode terminal 112 and one side of protective circuit board 120.

First and second lead tabs 130 and 140 are formed by nickel or nickel alloy, but not limited thereto. The first and second lead tabs can be manufactured by various metal materials.

And, first lead tabs 130 and connection terminal 1 are coupled to the side of bare cell 110 by double-sided tapes (i.e. stripes with adhesive material formed on both sides) 160 and 161. Double-sided tapes 160 and 161 are formed of an electrically insulating material, and first lead tab 130 and connection terminal 1 may be insulated from the outside surface of bare cell 110.

As described above, according to a connection terminal and a secondary battery using the same of the present invention, because the connection terminal installed between a bare cell and a protective circuit board has the function of preventing the protective circuit board from being pressed between the side surface of the bare cell and the protective circuit board and the function of supporting the protective circuit board as well as the basic function of electrical coupling, a separate support is not installed between the bare cell and the protective circuit board, and thus the manufacturing cost of the secondary battery is reduced and the manufacturing process thereof is simplified.

What is claimed is:

1. A secondary battery, comprising:
   a bare cell chargeable and dischargeable;
   a protection circuit board arranged to face a first side of the bare cell;
   a connection terminal, the connection terminal being installed between the first side of the bare cell and the protective circuit board, the connection terminal including a connection part which is electrically connected with one electric terminal of the protective circuit board and a support part which has a horizontal support part physically connected to the first side of the bare cell and a vertical support part physically connecting the horizontal support part to the connection part, and the connection part comprising a step positioned intermediate to the connection part and the horizontal support part of the support part and the step stepping down perpendicularly from the protective circuit board towards the bare cell and extends in a direction parallel to the connection part and the bare cell;
   a first lead tab connecting a first polarity of the bare cell to the connection terminal; and
   a second lead tab connecting a second polarity of the bare cell to the protective circuit board.

2. The secondary battery of claim 1,
   in which the bare cell has an external shape which two relatively larger sides are coupled to four relatively smaller continuous sides and face each other, and the four smaller sides have one pair of long parallel side parts and one pair of short parallel side parts with reference to edges on which the four smaller sides are joined with the two larger sides, and an electrode terminal is installed on any one of the one pair of short side parts in an insulated state, and
   in which the horizontal support part of the connection terminal is physically connected to any one of the one pair of long side parts of the bare cell.

3. The secondary battery of claim 2, in which the electrode terminal of the bare cell and the connection terminal are connected by the first lead tab.

4. The secondary battery of claim 2, in which the horizontal support part of the connection terminal is physically connected to the long side part of the bare cell by a stripe with adhesive and electrically insulating material formed on both sides.

5. The secondary battery of claim 1, in which at least a side of the connection part which is electrically connected to the one electric terminal of the protective circuit board is formed by a conductive plate, and the conductive plate has the step which is formed to be stepped away from the one electric terminal of the protective circuit board, and one end of the first lead tab is electrically coupled to the step.

6. The secondary battery of claim 1, in which the connection terminal and the first lead tab are connected by a secondary protective element.

7. The secondary battery of claim 6, in which the secondary protective element is a positive temperature coefficient element.

8. The secondary battery of claim 1, in which the first and second lead tabs are formed by nickel or nickel alloy.

9. The secondary battery of claim 1, in which the protective circuit board, the connection terminal and the first lead tab are physically coupled to the bare cell by a stripe with adhesive and electrically insulating material formed on both sides attached to the bare cell.

10. The secondary battery of claim 1, in which at least a side portion of the connection part which is electrically connected to the one electric terminal of the protective circuit board is formed by a conductive plate, and at least a portion of the support part has an insulating part to insulate the conductive plate of the connection part from the first side of the bare cell.

11. The secondary battery of claim 10, in which the conductive plate of the connection part has the step which is formed to be stepped away from the one electric terminal of the protective circuit board.

12. The secondary battery of claim 1, with the vertical support part of the support part of the connection terminal being formed in a curved shape.

13. The secondary battery of claim 1, in which at least one through-hole through which a molding resin passes is formed on the vertical support part of the connection terminal.

14. The secondary battery of claim 13, in which the through-hole is formed on an inside portion of the vertical support part, and the inside portion is a portion of the vertical support part excluding a circumference of the vertical support part.

15. The secondary battery of claim 13, in which either the through-hole or a partial through hole is formed by being inwardly cut away from a circumference of the vertical support part.

16. The secondary battery of claim 1, in which in a lengthwise direction of the first side of the bare cell, the horizontal support part and the vertical support part have a length that is approximately half of the length of the connection part and are positioned at the center of the connection part.

17. The secondary battery of claim 1, in which the horizontal support part is fixed to the first side of the bare cell by a stripe with adhesive and electrically insulated material formed on both sides.

18. A secondary battery, comprising:
   a bare cell amenable to being electrically charged and discharged;
   a protection circuit board arranged to face a first side of the bare cell;
   a molding resin disposed between the bare cell and the protective circuit board to physically connect the bare cell and protective circuit board together;
   a connection terminal disposed between the first side of the bare cell and the protective circuit board, said connection terminal including a connection part electrically coupled with one electric terminal of the protective circuit board and a support part having a horizontal part physically connected to the first side of the bare cell and a vertical part physically connecting the horizontal part to the connection part, and the connection part comprising a step positioned intermediate to the connection part and the horizontal part of the support part and the step stepping down perpendicularly from the protective circuit board towards the bare cell and extends in a direction parallel to the connection part and the bare cell;
   a first tab electrically connecting a first pole having a first polarity of the bare cell to the protective circuit board through the connection terminal; and a second tab electrically connecting a second pole having the second polarity of the bare cell to the protective circuit board.

\* \* \* \* \*